UNITED STATES PATENT OFFICE.

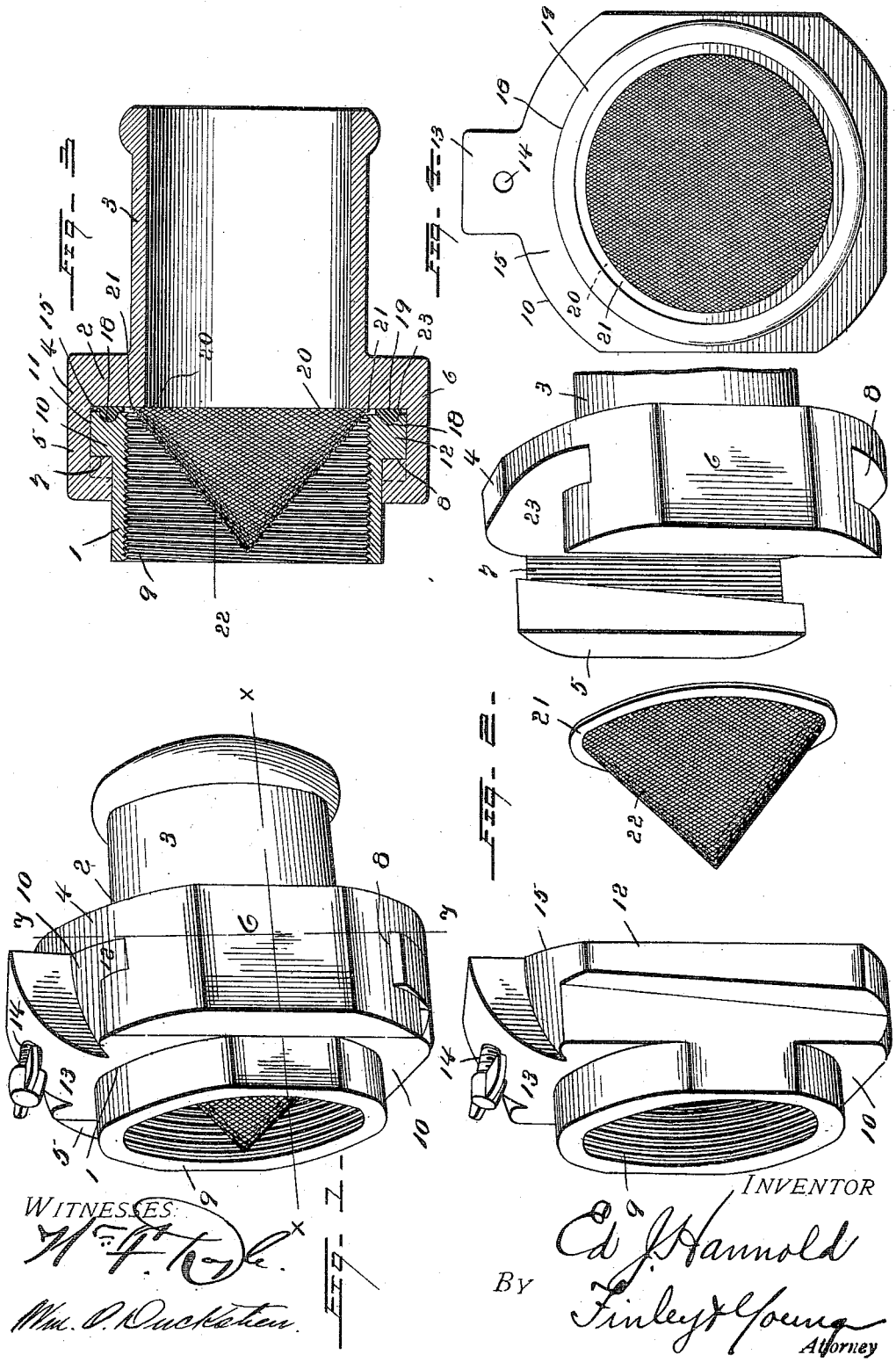

ED J. HANNOLD, OF MEXICO, MISSOURI, ASSIGNOR, BY MESNE ASSIGNMENTS, TO C. M. CLAY.

HOSE-COUPLING.

979,481. Specification of Letters Patent. Patented Dec. 27, 1910.

Application filed August 7, 1905. Serial No. 273,126.

*To all whom it may concern:*

Be it known that I, ED J. HANNOLD, a citizen of the United States, residing at Mexico, in the county of Audrain and State of Missouri, have invented a new and useful Improvement in Hose-Couplings, of which the following is a specification, the said invention being an improvement on United States Patent for hose-couplings numbered 645,707, granted to the said ED J. HANNOLD on the 20th day of March, 1909, which said original invention is fully described in the said Letters Patent No. 645,707, granted to the said ED J. HANNOLD on the said invention.

My invention relates to improvements in pipe and hose couplings, and pertains more particularly to a coupling between a locomotive and tender.

The object of my invention is to provide a coupling of this character which is more readily coupled and uncoupled and also adapted to support a strainer for straining the water feed to the locomotive and in which a tight joint is made and the coupling positively locked against accidental uncoupling.

Another object of my invention is to provide a more simple and effective device of this character.

In the accompanying drawings: Figure 1 is a perspective view of my improved coupling complete; Fig. 2 is a perspective view of the sections detached; Fig. 3 is a longitudinal sectional view taken on the line *x—x* of Fig. 1; and Fig. 4 is a transverse sectional view taken on the line *y—y* of Fig. 1.

Referring now to the drawings, 1 represents the male and 2 the female sections of my improved couplings. The male section 1 being the section that is screwed onto the injector pipe on the locomotive, while the female section is the section to which the hose leading from the tender is attached. The female section 2 is formed of a cylindrical portion 3, to which the hose is attached and the outer end of said portion 3 is provided with an outwardly extending flange 4 which is provided at two opposite sides with the outwardly extending elongated projections 5 and 6. The said projections on their inner face are provided with wedge shaped tapering recesses 7 and 8, by means of which the two sections are tightly coupled together, as will be hereinafter fully described.

The male section 1 has a short cylindrical portion 9 which is internally screw-threaded and which is adapted to be screwed upon the injector pipe on the locomotive, and to accommodate such pipe, the diameter of the central opening in the male section is greater than that of the central opening in the female section by an amount equal to the thickness of the walls of the injector pipe. The opposite end of the male section is provided with an enlarged laterally extending flange 10, the edge of which, on two opposite sides, is provided with outwardly extending elongated wedge-shaped tapering projections 11 and 12, and are of a size so as to snugly fit within the recesses 7 and 8 carried by the female section 2. The male section 1 being so attached that the wedge-shaped projections 11 and 12 have their smaller end upward, so that, when the female section is placed thereon, the same will be held together by force of gravity.

In order to provide for a positive locking means for holding the two sections together, I provide the male section 2 with a projection 13, through which passes the set-screw 14, and after the two sections are interlocked the same may be screwed inwardly, so as to project above the edge of the flange 4, and thus the two sections are held in their coupled position against accidental displacement, but not so rigidly secured as to prevent the working down as they are coupled and thus ride to a bearing.

The male section has its bearing surface 15 provided with an undercut annular groove or recess 18, in which is carried a packing ring or gasket 19, which is preferably of rubber, although other material may be used, and when the two sections are wedged together the said ring is expanded against the bearing surface 15 of the section 2 and forms a tight joint therewith. The recess 18 is placed a short distance from the opening communicating with the injector and forming a ledge 20 between said injector opening and the packing recess. When the injector pipe 23 is screwed into the cylindrical portion 9 of the male section 1, a space remains between the end of said pipe and the face of the female section 2, in which rests the laterally-turned end 21 of a conical shaped strainer 22. The strainer has its pointed end extending within the cylinder 9 of the male section toward the injector, and thus when the two sections are wedged together, the laterally-turned end is carried between the end of the injector pipe, and the face of the female section, and held in position.

It will be appreciated, from the foregoing description, that when the two sections are coupled, the smaller ends of the tapering wedge-shaped projections 11 and 12 on the male section are inserted in the larger ends of the tapering wedge-shaped recesses 7 and 8 on the female section and by reason of the corresponding tapering shapes of the two parts, they are brought into close contact and form a tight joint when the central openings therein register. Thus it will be seen that a clearance space is provided for the lower edge of the female section to pass the projecting gasket 19, before the bearing faces are brought together. By reason of said formation, the sides of the wedge-shaped projections 11 and 12 on the male section, need not be brought into contact with the walls of the recesses in the female section, for the purpose of completing the tight joint, thus diminishing the friction and danger of the parts corroding and adhering.

Having thus fully described my invention, what I claim as new and desire to secure by Letters Patent is:

A coupling, comprising two interlocking members having enlarged abutting surfaces, vertically disposed wedge-shaped projections on one of the members, flanges on the opposite member in which are formed vertically disposed wedge-shaped recesses, there being centrally disposed openings formed through the members, one of which is internally threaded to receive an injector pipe and the other member being arranged to receive a flexible hose, there being a groove formed in the face of one of the members, an elastic gasket seated in said groove and normally projecting beyond the face of said member, a conical strainer having a laterally bent edge arranged to be held between the abutting faces of said members, a lug formed integral with the top of one of the members having a diagonally disposed internally threaded opening therethrough and a screw seated in said opening arranged to engage the opposite coupling member, said screw being arranged to force downwardly one member and hold the coupling members against leakage.

In testimony whereof I have signed my name to this specification in the presence of two subscribing witnesses.

ED J. HANNOLD.

Witnesses:
   E. H. TINCHER,
   R. H. EDMUND.

It is hereby certified that in Letters Patent No. 979,481, granted December 27, 1910, upon the application of Ed J. Hannold, of Mexico, Missouri, for an improvement in "Hose-Couplings," an error appears in the printed specification requiring correction as follows: Page 1, line 11, the date "1909" should read *1900;* and that the said Letters Patent should be read with this correction therein that the same may conform to the record of the case in the Patent Office.

Signed and sealed this 31st day of January, A. D., 1911.

[SEAL.]
C. C. BILLINGS,
*Acting Commissioner of Patents.*